(12) United States Patent
Brown et al.

(10) Patent No.: US 9,534,343 B2
(45) Date of Patent: Jan. 3, 2017

(54) PARTIALLY FLUORINATED COPOLYMER EMULSIONS CONTAINING FATTY ACIDS AND ESTERS

(71) Applicant: THE CHEMOURS COMPANY FC LLC, Wilmington, DE (US)

(72) Inventors: Gerald Oronde Brown, Wilmington, DE (US); John Christopher Sworen, Chadds Ford, PA (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 314 days.

(21) Appl. No.: 14/033,542

(22) Filed: Sep. 23, 2013

(65) Prior Publication Data

US 2014/0113517 A1 Apr. 24, 2014

Related U.S. Application Data

(60) Provisional application No. 61/715,468, filed on Oct. 18, 2012.

(51) Int. Cl.
| | | |
|---|---|---|
| *D06M 13/08* | (2006.01) | |
| *C09D 133/16* | (2006.01) | |
| *C08F 220/24* | (2006.01) | |
| *D06M 15/263* | (2006.01) | |
| *D06M 15/27* | (2006.01) | |
| *D06M 15/277* | (2006.01) | |
| *D06M 15/29* | (2006.01) | |
| *D06M 15/21* | (2006.01) | |

(52) U.S. Cl.
CPC ............ *D06M 13/08* (2013.01); *C08F 220/24* (2013.01); *C09D 133/16* (2013.01); *D06M 15/21* (2013.01); *D06M 15/263* (2013.01); *D06M 15/27* (2013.01); *D06M 15/277* (2013.01); *D06M 15/29* (2013.01); *Y10T 442/2172* (2015.04)

(58) Field of Classification Search
CPC ...... D06M 13/08; D06M 15/27; D06M 15/29; D06M 15/21; D06M 15/263; D06M 15/277; C09D 133/16; C08F 220/24; Y10T 442/2172
USPC ............ 442/59, 82, 88, 93, 94, 98, 152–177
See application file for complete search history.

(56) References Cited

U.S. PATENT DOCUMENTS

| | | |
|---|---|---|
| 3,242,117 A | 3/1966 | Cohen |
| 3,282,905 A | 11/1966 | Fasick |
| 3,336,157 A | 8/1967 | Shane |
| 3,979,469 A | 9/1976 | Jager |
| 4,004,059 A | 1/1977 | Deiner |
| 4,076,881 A | 2/1978 | Sato |
| 4,935,464 A | 6/1990 | Ona |
| 5,077,119 A | 12/1991 | Wraige |
| 5,084,191 A | 1/1992 | Nagase |
| 5,413,724 A | 5/1995 | Kosal |
| 5,481,028 A | 1/1996 | Petrov |
| 5,792,711 A | 8/1998 | Roberts |
| 6,030,663 A | 2/2000 | McClain |
| 6,172,031 B1 * | 1/2001 | Stevens ............... C11D 3/2068 510/417 |
| 6,479,605 B1 | 11/2002 | Franchina |
| 6,610,775 B1 | 8/2003 | Oharu et al. |
| 6,753,376 B1 | 6/2004 | Yamana et al. |
| 7,015,275 B1 | 3/2006 | Aga et al. |
| 7,037,440 B2 | 5/2006 | Chrobaczek |
| 7,632,910 B2 | 12/2009 | Will |
| 7,754,836 B2 | 7/2010 | Kashiwaga |
| 7,998,915 B2 | 8/2011 | Ponder |
| 8,466,100 B2 | 6/2013 | Ponder |
| 2005/0090600 A1 | 4/2005 | Aga |
| 2005/0107554 A1 | 5/2005 | Franchina |
| 2006/0074188 A1 | 4/2006 | Franchina |
| 2007/0100064 A1 | 5/2007 | Fukumori |
| 2007/0135559 A1 | 6/2007 | Fukumori |
| 2009/0264037 A1 | 10/2009 | Ludemann |
| 2010/0190879 A1 | 7/2010 | Ludemann |

FOREIGN PATENT DOCUMENTS

| | | |
|---|---|---|
| CN | 101805990 A | 8/2010 |
| CN | 102124092 A | 7/2011 |
| EP | 0234724 A1 | 9/1987 |
| EP | 0656438 A1 | 7/1995 |
| EP | 1690908 A1 | 8/2006 |
| EP | 2036932 A1 | 3/2009 |
| EP | 18919763 B1 | 7/2012 |
| EP | 2141212 B1 | 9/2013 |
| GB | 1141254 | 1/1969 |
| GB | 1189501 | 4/1970 |

(Continued)

OTHER PUBLICATIONS

Balague et al., Synthesis of Fluorinated Telomers, Part 1, Telomerization of Vinylidene Fluoride with Perfluoroalkyl Iodides, Journal of Fluorine Chemistry, 1995, 70, 2, 215-23.

(Continued)

*Primary Examiner* — Jennifer Chriss
*Assistant Examiner* — Frank Vineis

(57) ABSTRACT

An aqueous emulsion composition comprising: i) partially fluorinated copolymer; ii) one or more co-solvents; iii) one or more surfactants; and optionally iv) one or more defoamers; wherein the co-solvent comprises fatty acids, esters of fatty acids, glycerides, glycols, or mixture thereof, and is useful for providing water and oil repellency to fibrous substrates without excessive pad roller build-up during application.

16 Claims, No Drawings

(56) References Cited

FOREIGN PATENT DOCUMENTS

| GB | 1303806 A | 1/1973 |
|---|---|---|
| JP | 50018371 | 2/1975 |
| JP | 61276880 A | 5/1986 |
| JP | 5263070 | 10/1993 |
| JP | 5302271 | 11/1993 |
| JP | 6017034 | 1/1994 |
| JP | 7173772 | 7/1995 |
| JP | 8-109580 A | 4/1996 |
| WO | 9511877 A1 | 5/1995 |
| WO | 0037583 A1 | 6/2000 |
| WO | 0049221 | 8/2000 |
| WO | 0061696 A1 | 10/2000 |
| WO | 03062347 A1 | 7/2003 |
| WO | 2005103362 A1 | 11/2005 |
| WO | 2009039961 A1 | 4/2009 |
| WO | 2009042083 A2 | 4/2009 |
| WO | 2009119423 A1 | 10/2009 |
| WO | 2009154126 A1 | 12/2009 |
| WO | 2010132262 A2 | 11/2010 |
| WO | 2011056525 A1 | 5/2011 |
| WO | 2013137386 A1 | 9/2013 |

OTHER PUBLICATIONS

International Search Report and Written Opinion, PCT/US2013/064908, Filing Date Oct. 15, 2013.

\* cited by examiner

PARTIALLY FLUORINATED COPOLYMER EMULSIONS CONTAINING FATTY ACIDS AND ESTERS

FIELD OF THE INVENTION

This invention relates to aqueous emulsions of partially fluorinated copolymers and fatty acids and esters, the manufacture thereof, and the methods of use thereof on fibrous substrates provide water and oil repellency, and stain resistance without excess roll buildup upon application.

BACKGROUND OF THE INVENTION

Partially fluorinated copolymers have been used to provide oil and water repellency and stain release to fibrous substrates fabrics. The current trend in these copolymers is to use shorter fluorinated monomers to reduce costs. By shortening the fluorinated components, the industry has experienced additional, unexpected difficulties. Some of these difficulties include roller build-up and foaming conditions. Several attempts have been made to eliminate these issues without creating other issues such as reduction in oil and water repellency and/or reduction in stain release performance.

It has been surprisingly found that the present invention meets this need.

SUMMARY OF THE INVENTION

An aqueous emulsion composition comprising
i) a partially fluorinated copolymer comprising the reaction product of monomers:
a) one or more monomers of Formula (I):

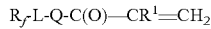  (I);

b) one or more monomers of Formula (II):

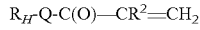  (II);

c) of one or more monomers of Formula (III):

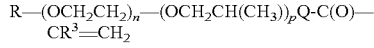  (III);

d) one or more monomers of Formula (V):

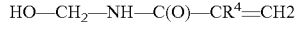  (IV);

and
ii) one or more co-solvents;
iii) one or more surfactants; and optionally
iv) one or more defoamers;
wherein
$R_f$ is a linear or branch fluoroalkyl of 2 to 10 carbons optionally interrupted by 1 to 4 interrupting groups —O—, —$CH_2$—, and/or —CHF— groups;
$R_H$ is a linear, branched, or cyclic alkyl chain of 7 to 22 carbons;
each Q is independently —O— or —S—;
L is —$R^5$—, —$SO_2$—N($R^6$)—$R^7$—, —CO—N($R^8$)—$R^7$—, —$CH_2$CH(O$R^9$)$CH_2$—, —$R^7$—$SO_2$—N($R^8$)—, or —$R^7$—O—C(O)—N($R^8$)—$R^7$—;
$R^1$, $R^2$, $R^3$, and $R^4$ are each independently H or —$CH_3$;
R is —H or a linear, branched, or cyclic alkyl chain of 1 to 20 carbons;
$R^5$ and $R^7$ are each independently a linear or branched divalent alkyl chain of 2 to 10 carbons;
$R^6$, $R^8$ and $R^9$ are each independently —H, —$CH_3$, $C_2$ to $C_{10}$ alkylene, or $C_1$ to $C_4$ acyl; and
n is 0 to 10 and p is 0 to 10 provided that p+n is greater than 0;
wherein the concentration of monomers of a), b), c), and d) are equal to 100% by weight of the copolymer. In one embodiment, the partially fluorinated copolymer further comprises e) one or more monomers of vinylidene chloride, vinyl chloride, or mixtures thereof.

The present invention also relates to a method for treating a fibrous substrate comprising contacting the fibrous substrate with an emulsion composition as defined above.

DETAILED DESCRIPTION

Herein trademarks are shown in upper case.
The term "(meth)acrylate" is used herein defined to mean both "acrylate" and "methacrylate".
In the present invention, the concentration of the monomers a), b), c), d), and optionally e) can be present at any effective concentration. The total concentration of each monomer is selected such that the total sum is equal to 100%.

The present invention is an aqueous emulsion composition comprising
i) a partially fluorinated copolymer comprising the reaction product of monomers:
a) one or more monomers of Formula (I):

  (I);

b) one or more monomers of Formula (II):

  (II);

c) of one or more monomers of Formula (III):

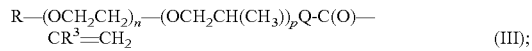  (III);

d) one or more monomers of Formula (IV):

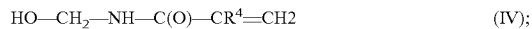  (IV);

and
ii) one or more co-solvents;
iii) one or more surfactants; and optionally
iv) one or more defoamers;
wherein
$R_f$ is a linear or branch fluoroalkyl of 2 to 10 carbons optionally interrupted by 1 to 4 interrupting groups —O—, —$CH_2$—, and/or —CHF— groups;
$R_H$ is a linear, branched, or cyclic alkyl chain of 7 to 22 carbons;
each Q is independently —O— or —S—;
L is —$R^5$—, —$SO_2$—N($R^6$)—$R^7$—, —CO—N($R^8$)—$R^7$—, —$CH_2$CH(O$R^9$)$CH_2$—, —$R^7$—$SO_2$—N($R^8$)—, or —$R^7$—O—C(O)—N($R^8$)—$R^7$—;
$R^1$, $R^2$, $R^3$, and $R^4$ are each independently H or —$CH_3$;
R is —H or a linear, branched, or cyclic alkyl chain of 1 to 20 carbons;
$R^5$ and $R^7$ are each independently a linear or branched divalent alkyl chain of 2 to 10 carbons;
$R^6$, $R^8$ and $R^9$ are each independently —H, —$CH_3$, $C_2$ to $C_{10}$ alkylene, or $C_1$ to $C_4$ acyl; and
n is 0 to 10 and p is 0 to 10 provided that p+n is greater than 0;
wherein the concentration of monomers of monomers of a), b), c) and d) are equal to 100% by weight of the copolymer. In one embodiment, the partially fluorinated copolymer further comprises e) one or more monomers of vinylidene chloride, vinyl chloride, or mixtures thereof.

The aqueous emulsion composition of the present invention comprises i) a partially fluorinated copolymer; ii) one or more co-solvents; iii) one or more surfactants; and optionally iv) one or more defoamers.

The partially fluorinated copolymer comprises the reaction product of the following monomers:

a) one or more monomers of Formula (I):

$$R_f\text{-L-Q-C(O)}\text{—}CR^1\!=\!CH_2 \qquad (I);$$

b) one or more monomers of Formula (II):

$$R_H\text{-Q-C(O)}\text{—}CR^2\!=\!CH_2 \qquad (II);$$

c) of one or more monomers of Formula (III):

$$R\text{—}(OCH_2CH_2)_n\text{—}(OCH_2CH(CH_3))_p\text{Q-C(O)}\text{—}CR^3\!=\!CH_2 \qquad (III);$$

d) one or more monomers of Formula (IV):

$$HO\text{—}CH_2\text{—}NH\text{—}C(O)\text{—}CR^4\!=\!CH2 \qquad (IV);$$

and optionally e) one or more monomers of vinylidene chloride, vinyl chloride, or mixtures thereof.

The partially fluorinated copolymer includes repeat units from one or more monomers of Formula (I):

$$R_f\text{-L-Q-C(O)}\text{—}CR^1\!=\!CH_2 \qquad (I)$$

wherein $R_f$ is a linear or branch fluoroalkyl of 2 to 10 carbons optionally interrupted by 1 to 4 interrupting groups —O—, —$CH_2$—, and/or —CHF— groups; $R_H$ is a linear, branched, or cyclic alkyl chain of 7 to 22 carbons; each Q is independently —O— or —S—; L is —$R^5$—, —$SO_2$—$N(R^6)$—$R^7$—, —CO—$N(R^8)$—$R^7$—, —$CH_2CH(OR^9)CH_2$—, —$R^7$—$SO_2$—$N(R^8)$—, or —$R^7$—O—C(O)—$N(R^8)$—$R^7$—; $R^1$ is —H or —$CH_3$; $R^5$ and $R^7$ are each independently a linear or branched divalent alkyl chain of 2 to 10 carbons; and $R^6$, $R^8$ and $R^9$ are each independently —H, —$CH_3$, $C_2$ to $C_{10}$ alkylene, or $C_1$ to $C_4$ acyl.

Examples of $R_f$ include, but are not limited to, $CF_3(CF_2)_x$—, $CF_3(CF_2)_x(CH_2CF_2)_y$—, $CF_3(CF_2)_yO(CF_2)_y$—, and $CF_3(CF_2)_yOCFH(CF_2)_z$—, wherein each x is independently 1 to 9, each y is independently 1 to 3, and each z is independently 1 to 4. Preferably, $R_f$ is $C_4$ to $C_8$ fluoroalkyl, more preferably, $R_f$ is $C_6$ fluoroalkyl.

Fluorinated (meth)acrylates of Formula (I) are synthesized from the corresponding alcohols. These fluorinated (meth)acrylate compounds are prepared by either esterification of the corresponding alcohol with acrylic acid or methacrylic acid or by tranesterification with methyl(meth)acrylate or methyl(meth)acrylate. These preparations are well known and are described in U.S. Pat. No. 3,282,905, herein incorporated by reference.

Fluorinated (meth)acrylates useful in the present invention are prepared from alcohols having the formula $CF_3(CF_2)_x$-L-Q-H wherein each x is individually 1 to 9; L is $R^{12}$ and $R^{12}$ is a linear or branched divalent alkyl chain of 2 to 10 carbons, and Q is O are commercially available from E. I. du Pont de Nemours and Company, Wilmington, Del. These alcohols are also be prepared by reaction of the corresponding perfluoroalkyl iodides with oleum and hydrolyzed according to the procedure described in WO 95/11877, herein incorporated by reference. These alcohols are available as a homologue distribution mixture or are fraction distilled into individual chain lengths.

Fluorinated (meth)acrylates useful in the present invention are prepared from alcohols having the formula $CF_3(CF_2)_x(CH_2CF_2)_y$-L-Q-H wherein each x is independently 1 to 4, each y is 1 to 3, and Q is O. These alcohols are prepared by the telomerization of perfluoroalkyl iodides with vinylidene fluoride followed by ethylene insertion. A detailed description of the vinylidene fluoride reaction is described in Balague, et al., "Synthesis of Fluorinated telomers, Part 1, Telomerization of vinylidene fluoride with perfluoroalkyl iodides", J. Fluor. Chem. (1995), 70(2), 215-23. Reaction details for the ethylene insertion reaction are described in U.S. Pat. No. 3,979,469. The alcohols are prepared with oleum and hydrolysis as described above.

Fluorinated (meth)acrylates useful in the present invention are prepared from alcohols having the formula $CF_3(CF_2)_yO(CF_2)_y$-L-Q-H wherein each w is independently 1 to 3, Q is O, and each y is independently 1 to 3. These alcohols are prepared from the corresponding perfluoroalkyl ether iodides, of formula $CF_3(CF_2)_yO(CF_2)_yI$ wherein each y is independently 1 to 3. These iodides are prepared according to the procedure described in U.S. Pat. No. 5,481,028, hereby incorporated by reference, by reacting a perfluorovinyl ether with ICl/HF and $BF_3$. Ethylene insertion and alcohol conversion is as described above.

The above fluorinated (meth)acrylate monomers are available either from Sigma-Aldrich (St. Louis, Mo.) or from E. I. du Pont de Nemours and Company (Wilmington, Del.).

The partially fluorinated copolymer of the present invention comprises repeat units from b) one or more monomers of Formula (II):

$$R_H\text{-Q-C(O)}\text{—}CR^2\!=\!CH_2 \qquad (II)$$

wherein $R_H$ is a linear, branched, or cyclic alkyl chain of 7 to 22 carbons;
each Q is independently —O— or —S—; and $R^2$ is —H or —$CH_3$.

Preferably, $R_H$ is 8 to 20 carbons. $R_H$ is preferably octyl, 2-ethylhexyl, decyl, isodecyl, lauryl, cetyl, cyclohexyl, norboryl, or stearyl. The preferred examples of comonomer b) are 2-ethylhexyl methacrylate, lauryl methacrylate and stearyl methacrylate. Monomers of Formula (II) are readily available from suppliers such as Sigma-Aldrich (St. Louis, Mo.).

The partially fluorinated copolymer of the present invention comprises repeat units from c) one or more monomers of Formula (III):

$$R\text{—}(OCH_2CH_2)_n\text{—}(OCH_2CH(CH_3))_p\text{Q-C(O)}\text{—}CR^3\!=\!CH_2 \qquad (III)$$

wherein $R^3$ is H or —$CH_3$; R is —H or a linear, branched, or cyclic alkyl chain of 1 to 20 carbons; and n is 0 to 10 and p is 0 to 10 provided that p+n is greater than 0. Both n and p are each independently integers from 0 to 10 and include any number from 0, 0.1, 0.2, 0.3 . . . 9.8, 9.9, and 10. Compounds of formula (III) encompass compounds have the following structures of R—$(OCH_2CH_2)_n$—$(OCH_2CH(CH_3))_p$Q-C(O)—$CR^3\!=\!CH_2$ and R—$(OCH_2CH_2)_n$—$(OCH_2CH(CH_3))_p$Q-C(O)—$CR^3\!=\!CH_2$ and compounds of Formula (III) where ($OCH_2CH_2$) and ($OCH_2CH(CH_3)$) are randomly distributed throughout. Compounds of Formula (III) may be a mixture of 2 or more compounds with n and p are defined as a number average of repeat units for the respective repeat units of ethylene oxide and propylene oxide. By "number average" it is meant that the average number listed, such as 3.5-EO/2.5-PO methacrylate, represents a mixture of compounds containing polyethylene oxide (EO) and/or polypropylene oxide (PO) repeat units where the average number of EO units equal 3.5 and the average number of PO units equal 2.5.

Examples of monomers of formula (III) include but not limited to 7-EO methacrylate, 9-PO methacrylate, and 3.5-EO/2.5-PO methacrylate. Monomers of formula (III) are commercially available from NOF Corporation, Shibuya-ku, Tokyo, Japan. Commercially available examples include, but not limited to, BLEMMER E, BLEMMER P, BLEMMER PP-1000, BLEMMER 50PEP-300, BLEMMER 70PEP-350B, BLEMMER PAE-50, BLEMMER PAE-100, and BLEMMER 43APE-600B.

The partially fluorinated copolymer of the present invention comprises repeat units from d) one or more monomers of Formula (IV)

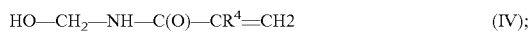  (IV);

wherein $R^4$ is —H or —CH$_3$.

Examples of compounds of Formula (IV) are N-methylol methacrylate and N-methylolacrylamide.

In one embodiment, the partially fluorinated copolymer of the present invention, may further comprise repeat units from e) one or more monomers of vinylidene chloride, vinyl chloride, or mixtures thereof. When one or more monomers of vinylidene chloride, vinyl chloride, or mixtures thereof are present, the concentration of monomers of a), b), c), d), and e) are equal to 100% by weight of the copolymer. It is well known to control molecular weight of the polymer during polymerization with the addition of a chain transfer agent. An example of a chain transfer agent includes, but is not limited to, 1-dodecanethiol. All of the embodiments of the partially fluorinated copolymer may further comprise chain transfer agents.

The aqueous emulsion composition of the present invention comprises one or more co-solvents. These co-solvents are compounds that are present during and after the polymerization of the monomers, as defined above. The co-solvents are present and aid in the performance of the emulsion composition to provide surface effects such as, but not limited to, water and oil repellency and/or stain release. Examples of co-solvents which contain a mixture of fatty acids, methyl esters of fatty acids, glycerides, or mixtures thereof include, but are not limited to, STEPOSOL SB-D and STEPOSOL SB-W, both commercially available from Stepan Company, Northfield, Ill.; SG 1000, SG 1100, SG 1500, SG 2000, SG 2500, SG 5000, all commercially available from SoyGold, Omaha, Nebr.; and biodiesel commercially available from Cargill, Minneapolis, Minn.

Suitable co-solvents include, but are not limited to, fatty acids, esters of fatty acids, glycerides, glycols, glycerols, or mixtures thereof. One or more co-solvents can be used. In one embodiment, the co-solvent is soy methyl esters. In one embodiment, the co-solvent is soya fatty acid. In one embodiment, the co-solvent is stearic acid. In one embodiment, the co-solvent is oleic acid. In one embodiment, the co-solvent is a mixture of soy methyl ester and soya fatty acids. In one embodiment, the co-solvent is a mixture of soy methyl ester and stearic acid. In one embodiment, the co-solvent is one or more fatty acids. In one embodiment, the co-solvent is one or more esters of fatty acids. In one embodiment, the co-solvent is one or more glycerides. In one embodiment, the co-solvent is one or more glycols. In one embodiment, the co-solvent is one or more glycerols. In one embodiment, the co-solvent is a mixture of one or more fatty acids and one or more esters of fatty acids. In one embodiment, the co-solvent is a mixture of one or more fatty acids, one or more esters of fatty acids and one or more glycerides. In one embodiment, the co-solvent is a mixture of one or more fatty acids, one or more esters of fatty acids, one or more glycerides, and one or more glycols. In one embodiment, the co-solvent is a mixture of one or more fatty acids, one or more esters of fatty acids, one or more glycerides, one or more glycols, and one or more glycerols.

In one embodiment, the co-solvent is a mixture of one or more fatty acids and one or more glycerides. In one embodiment, the co-solvent is a mixture of one or more fatty acids and one or more glycols. In one embodiment, the co-solvent is a mixture of one or more fatty acids one or more glycols, and one or more glycerols. In one embodiment, the co-solvent is a mixture of one or more fatty acids, one or more glycerides, and one or more glycols. In one embodiment, the co-solvent is a mixture of one or more fatty acids, one or more glycerides, one or more glycols, and one or more glycerols. In one embodiment, the co-solvent is a mixture of one or more esters of fatty acids and one or more glycerides. In one embodiment, the co-solvent is a mixture of one or more esters of fatty acids, one or more glycerides, and one or more glycerols. In one embodiment, the co-solvent is a mixture of one or more esters of fatty acids and one or more glycols. In one embodiment, the co-solvent is a mixture of one or more esters of fatty acids, one or more glycols, and one or more glycerols. In one embodiment, the co-solvent is a mixture of one or more esters of fatty acids, one or more glycerides, and one or more glycols. In one embodiment, the co-solvent is a mixture of one or more esters of fatty acids, one or more glycerides, one or more glycols, and one or more glycerols. In one embodiment, the co-solvent is a mixture of one or more glycerides and one or more glycols. In one embodiment, the co-solvent is a mixture of one or more glycerides, one or more glycols, and one or more glycerols.

Fatty acids useful as co-solvents comprise saturated, unsaturated, conjugated fatty acids, or mixtures thereof. Examples of fatty acids useful as co-solvents in the present invention comprise soya fatty acid, ethanoic acid, propanoic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, myristoleic acid, palmitoleic acid, palmitic acid, sapienic acid, oleic acid, elaidic acid, vaccenic acid, linoleic acid, linoelaidic acid, α-linolenic acid, arachidonic acid, eicosapentaenoic acid, erucic acid, docosahexaenoic acid, hexadecatrienoic acid, alpha-linolenic acid, stearidonic acid, eicosatrienoic acid, eicosatetraenoic acid, eicosapentaenoic acid, heneicosapentaenoic acid, docosapentaenoic acid, tetracosapentaenoic acid, tetracosahexaenoic acid, linoleic acid, gamma-linolenic acid, eicosadienoic acid, dihomo-gamma-linolenic acid, arachidonic acid, docosadienoic acid, adrenic acid, docosapentaenoic acid, osbond acid, tetracosatetraenoic acid, tetracosapentaenoic acid, oleic acid, eicosenoic acid, mead acid, erucic acid, nervonic acid, rumenic acid, α-calendic acid, β-calendic acid, jacaric acid, stearic acid, α-eleostearic acid, β-eleostearic acid, catalpic acid, punicic acid, rumelenic acid, α-parinaric acid, β-parinaric acid, bosseopentaenoic acid, pinolenic acid, podocarpic acid, or mixtures thereof. Soya fatty acid is a mixture of linoleic acid, oleic acid, palmitic acid, stearic acid, and linolenic acid.

Esters of fatty acids useful as co-solvents comprise esters of saturated, unsaturated, conjugated fatty acids, or mixtures thereof. Esters of fatty acids useful as co-solvents comprise esters of soya fatty acids, esters of ethanoic acid, esters of propanoic acid, esters of butanoic acid, esters of pentanoic acid, esters of hexanoic acid, esters of heptanoic acid, esters of octanoic acid, esters of nonanoic acid, esters of decanoic acid, esters of undecanoic acid, esters of dodecanoic acid, esters of tridecanoic acid, esters of tetradecanoic acid, esters of pentadecanoic acid, esters of hexadecanoic acid, esters of myristoleic acid, esters of palmitoleic acid, palmitic acid, esters of sapienic acid, esters of oleic acid, esters of elaidic acid, esters of vaccenic acid, esters of linoleic acid, esters of linoelaidic acid, esters of α-linolenic acid, esters of arachidonic acid, esters of eicosapentaenoic acid, esters of erucic acid, esters of docosahexaenoic acid, esters of hexadecatrienoic acid, esters of alpha-linolenic acid, esters of stearidonic acid, esters of eicosatrienoic acid, esters of eicosatetraenoic acid, esters of eicosapentaenoic acid, esters of heneicosapentaenoic acid, esters of docosapentaenoic acid, esters of tetracosapentaenoic acid, esters of tetracosahexaenoic acid, esters of linoleic acid, esters of gamma-linolenic acid, esters of eicosadienoic acid, esters of dihomo-gamma-linolenic acid, esters of arachidonic acid, esters of docosadienoic acid, esters of adrenic acid, esters of docosapentaenoic acid, esters of osbond acid, esters of tetracosatetraenoic acid, esters of tetracosapentaenoic acid, esters of oleic acid, esters of eicosenoic acid, esters of mead acid, esters of erucic acid, esters of nervonic acid, esters of rumenic acid, esters of α-calendic acid, esters of β-calendic acid, esters of jacaric acid, esters of stearic acid, esters of stearic acid, α-eleostearic acid, esters of β-eleostearic acid, esters of catalpic acid, esters of punicic acid, esters of rumelenic acid, esters of α-parinaric acid, esters of β-parinaric acid, esters of bosseopentaenoic acid, esters of pinolenic acid, esters of podocarpic acid, or mixtures thereof.

Glycerides useful as co-solvents comprise mono-, di-, tri-glycerides or mixtures thereof. Examples of glycerides, include, but not limited to, mono-, di-, and tri-glycerides of the following acids: ethanoic acid, propanoic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, myristoleic acid, palmitoleic acid, palmitic acid, sapienic acid, oleic acid, elaidic acid, vaccenic acid, linoleic acid, linoelaidic acid, α-linolenic acid, arachidonic acid, eicosapentaenoic acid, erucic acid, docosahexaenoic acid, hexadecatrienoic acid, alpha-linolenic acid, stearidonic acid, eicosatrienoic acid, eicosatetraenoic acid, eicosapentaenoic acid, heneicosapentaenoic acid, docosapentaenoic acid, tetracosapentaenoic acid, tetracosahexaenoic acid, linoleic acid, gamma-linolenic acid, eicosadienoic acid, dihomo-gamma-linolenic acid, arachidonic acid, docosadienoic acid, adrenic acid, docosapentaenoic acid, osbond acid, tetracosatetraenoic acid, tetracosapentaenoic acid, oleic acid, eicosenoic acid, mead acid, erucic acid, nervonic acid, rumenic acid, α-calendic acid, β-calendic acid, jacaric acid, stearic acid, α-eleostearic acid, β-eleostearic acid, catalpic acid, punicic acid, rumelenic acid, α-parinaric acid, β-parinaric acid, bosseopentaenoic acid, pinolenic acid, podocarpic acid, or mixtures of thereof.

Glycerols useful as co-solvents comprise polyols of the following acids: ethanoic acid, propanoic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, myristoleic acid, palmitoleic acid, palmitic acid, sapienic acid, oleic acid, elaidic acid, vaccenic acid, linoleic acid, linoelaidic acid, α-linolenic acid, arachidonic acid, eicosapentaenoic acid, erucic acid, docosahexaenoic acid, hexadecatrienoic acid, alpha-linolenic acid, stearidonic acid, eicosatrienoic acid, eicosatetraenoic acid, eicosapentaenoic acid, heneicosapentaenoic acid, docosapentaenoic acid, tetracosapentaenoic acid, tetracosahexaenoic acid, linoleic acid, gamma-linolenic acid, eicosadienoic acid, dihomo-gamma-linolenic acid, arachidonic acid, docosadienoic acid, adrenic acid, docosapentaenoic acid, osbond acid, tetracosatetraenoic acid, tetracosapentaenoic acid, oleic acid, eicosenoic acid, mead acid, erucic acid, nervonic acid, rumenic acid, α-calendic acid, β-calendic acid, jacaric acid, stearic acid, α-eleostearic acid, β-eleostearic acid, catalpic acid, punicic acid, rumelenic acid, α-parinaric acid, β-parinaric acid, bosseopentaenoic acid, pinolenic acid, podocarpic acid, or mixtures of thereof.

Glycols useful as co-solvents comprise linear or branched diols, glycols, and mixtures thereof. Example of glycols include, but are not limited to, 1,2-propanediol, 1,2-butanediol, 2,3-butanediol, 1,3-butanediol, 1,2-pentanediol, etohexadiol, p-menthane-3,8-diol, 2-methyl-2,4-pentanediol, 1,3-propanediol, 1,4-butanediol, 1,5-pentanediol, 1,8-octanediol, propylene glycol, dipropylene glycol, ethylene glycol, diethylene glycol, etc.

The aqueous emulsion composition of the present invention comprises one or more surfactants. The surfactants may be cationic, anionic, nonionic surfactants, or mixtures thereof. Surfactants useful in the present invention are any of those surfactants commonly used for preparing aqueous emulsions. Surfactants suitable for use in the composition of the present invention include surfactants selected from the group consisting of an alkali metal salt of alpha sulfonated carboxylic acids or esters; an alkali metal salt of 1-octane sulfonate; alkyl aryl sulfate; alkali metal alkyl diphenyloxide disulfonate; alkali metal salt of dimethyl-5-sulfoisophthalate; salt of butyl naphthalene sulfonated salt of $C_{16}$-$C_{18}$ phosphate (such as potassium); salt of condensed naphthalene formaldehyde sulfonated (such as sodium); salt of dodecyl benzene sulfonate (branched) (such as sodium); salt of alkyl sulfate (such as sodium); alpha olefin sulfonate; salt of dodecyl diphenyloxide disulfonate; polyoxyethylene (20) cetyl ether; ethoxylated alcohol; alkyl dimethyl amine; polyoxyethylene tridecyl ether; dodecyl dimethyl ammonium acetate; alkali metal salts of sulfonated 1,1-oxybis, tetrapropylene benzene, and anionic surfactants. Preferred surfactants are cationic surfactants, non-ionic surfactants, or mixtures thereof.

Suitable commercially available nonfluorinated surfactants include ALPHA-STEP MC-48 (Stepan Company, Northfield, Ill.), ARMEEN DM12D and ARMEEN DM18D (AkzoNobel, Chicago, Ill.), BIO-TERGE PAS-8S (Stepan Company, Northfield, Ill.), BRIJ 58 (Uniqema, New Castle, Del.), CENEGEN 7 (Yorkshire America, Charlotte, N.C.), DEXTROL Foamer 916 (Dexter Chemical L.L.C., Bronx, N.Y.), DOWFAX 2A1 and TERGITOL TMN-10 (Dow Chemical Co., Midland, Mich.), ETHAL TDA-5 (Ethox Chemicals, LLC., Greenville, S.C.), NOPCOSPRSE 9268A (Henkel/Cognis, Cincinnati, Ohio), RHODAPON SB-82085 (Ashland Chemical Company, Columbus, Ohio), SULFON-ATE AA-10 (Tennessee Chemical Co., Atlanta, Ga.), ULTRAFOAM FFA-3 (Phoenix Chemical Company, Inc., Calhoun, Ga.), UNIFROTH 0448 (Unichem, Inc., Haw River, N.C.), WITCO C-6094 (Witco, Houston, Tex.), and WITCOLATE WAQE (Witco, Houston, Tex.).

The aqueous emulsion composition of the present invention may further comprise one or more defoamers. Any compound that is known to defoam emulsions may be used. These defoamers may, but not necessarily, be produced from silicone containing compositions. For the purpose of the present invention, the word "defoamer" also encompasses compounds defined as "anti-foamers".

The emulsion compositions of the present invention are prepared in water by free radical initiated polymerization of the monomers, as defined above, in the presence of one or more co-solvents, one or more surfactants, and optionally one or more defoamers. The final product is a copolymer with a random distribution of the monomers as defined above.

Prior to polymerization, monomers a), b), c), and d) are homogenized in water, with one or more co-solvents, one or more surfactants, and optionally one or more defoamers to create an emulsion. Homogenization can occur by any means known to those skilled in the art. Monomer e) can then optionally be added to the emulsion. The polymerization is then initiated by the addition of a free radical initiator, such as, for example, 2,2'-azobis(2-methylpropionamidine) dihydrochloride (E. I. du Pont de Nemours and Company, Wilmington, Del., commercially under the name of "VAZO 56"). The reaction is allowed to occur for approximately 2 to 8 hours or until the polymerization is completed. The final emulsion composition is then standardized from about 20% to from about 35.0% solids with water. The emulsion composition can then be applied to substrates to improve surface properties of the substrates, such as increased stain resistance.

The present invention further provides a method for treating a fibrous substrate to impart oil repellency, water repellency, and dynamic water repellency comprising contacting the surface of the substrate with an aqueous emulsion composition comprising
i) partially fluorinated copolymer comprising the reaction product of monomers:
a) one or more monomers of Formula (I):

b) one or more monomers of Formula (II):

c) of one or more monomers of Formula (III):

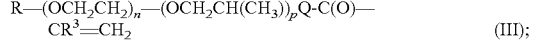

d) one or more monomers of Formula (IV):

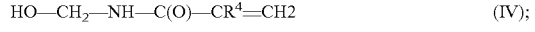

and
ii) one or more co-solvents;
iii) one or more surfactants; and optionally
iv) one or more defoamers;
wherein
$R_f$ is a linear or branch fluoroalkyl of 2 to 10 carbons optionally interrupted by 1 to 4 interrupting groups —O—, —CH$_2$—, and/or —CHF— groups;
$R_H$ is a linear, branched, or cyclic alkyl chain of 7 to 22 carbons;
each Q is independently —O— or —S—;
L is —R$^5$—, —SO$_2$—N(R$^6$)—R$^7$—, —CO—N(R$^8$)—R$^7$—, —CH$_2$CH(OR$^9$)CH$_2$—, —R$^7$—SO$_2$—N(R$^8$)—, or —R$^7$—O—C(O)—N(R$^8$)—R$^7$—;
$R^1$, $R^2$, $R^3$, and $R^4$ are each independently H or —CH$_3$;
R is —H or a linear, branched, or cyclic alkyl chain of 1 to 20 carbons;
$R^5$ and $R^7$ are each independently a linear or branched divalent alkyl chain of 2 to 10 carbons;
$R^6$, $R^8$ and $R^9$ are each independently —H, —CH$_3$, C$_2$ to C$_{10}$ alkylene, or C$_1$ to C$_4$ acyl; and
n is 0 to 10 and p is 0 to 10 provided that p+n is greater than 0;
wherein the concentration of monomers of a), b), c), and d) are equal to 100% by weight of the copolymer.

The emulsion composition of this invention in the form of an aqueous emulsion composition is contacted directly with a substrate to be rendered oil- and water-repellent. The emulsion composition of this invention is applied alone or in admixture with dilute nonfluorinated polymers, or with other textile treatment agents or finishes. The composition can be applied at a manufacturing facility, retailer location, or prior to installation and use, or at a consumer location.

Fibrous substrates suitable for practicing the method of the invention include those as described below. The emulsion composition polymers of this invention are generally applied to fibrous substrates by spraying, dipping, padding, or other well-known methods. The emulsions of the invention are generally diluted with water to concentrations of from about 5 g/L to about 100 g/L, preferably from about 10 g/L to about 50 g/L, based upon the weight of the fully formulated emulsion. After excess liquid has been removed, for example by squeeze rolls, the treated fabric is dried and then cured by heating, for example, to 110° C. to 190° C., for at least 30 seconds, typically 60-180 seconds. Such curing enhances repellency and durability. While these curing conditions are typical, some commercial apparatus may operate outside these ranges because of its specific design features.

The present invention further comprises a fibrous substrate having applied to its surface a polymer of the invention as previously described. Preferably the treated substrate has a fluorine content of from about 0.05% by weight to about 0.5% by weight, more preferably from about 0.1% to about 0.4%.

Suitable substrates include fibrous substrates. The fibrous substrates include woven and nonwoven fibers, yarns, fabrics, fabric blends, textiles, nonwovens, paper, rugs and carpets. These are made from natural or synthetic fibers including cotton, cellulose, wool, silk, polyamide, polyester, polyolefin, polyacrylonitrile, polypropylene, rayon, nylon, aramid, and acetate. By "fabric blends" is meant fabric made of two or more types of fibers. Typically, these blends are a combination of at least one natural fiber and at least one synthetic fiber, but also can include a blend of two or more natural fibers or of two or more synthetic fibers. Carpet substrates can be dyed, pigmented, printed, or undyed. Fibers and yarns in the carpet substrates may be dyed, pigmented, printed, or undyed. Carpet substrates can be scoured or unscoured. Substrates to which it is particularly advantageous to apply the polymer of the present invention so as to impart repellency properties include polyamide (such as nylon) polyester, cotton, and blends of polyester and cotton. The nonwoven substrates include, for example, spunlaced nonwovens, such as SONTARA available from E. I. du Pont de Nemours and Company, Wilmington, Del., and spunbonded-meltblown-spunbonded (SPS) nonwovens.

The emulsions of this invention are useful in rendering the substrate surface repellent to oil and water and stain release. The repellency is durable after multiple launderings. The polymer emulsions of the present invention also have the advantage of not producing a noticeable roller or fabric build-up. Pad roller build-up is common at textile mills where pad rollers are used to apply finishes to fibrous substrates. Pad roller build-up is unwanted as it causes a polymer film to build up on textile rollers during the finishing processing. The built up polymer film on the roller ends up being deposited onto the finished textile causing the appearance of visible imperfections (i.e., spots, discoloration, waxy appearance, etc.). Also, considerable breaks in textile mill operations are accrued due to the difficulty in cleaning the polymer coated rollers. The emulsions of the present invention are advantageous in that they can be used under a wide variety of application conditions (i.e., hot or cold climates) due to their stability. The treated substrates of the present invention are useful in a variety of applications and products such as clothing, protective garments, carpet, upholstery, furnishings, and other uses. The excellent surface properties described above help to maintain surface cleanliness and therefore can permit longer use.

EXAMPLES

Test Method 1

Roller Build-Up Test

Emulsions of the present invention were tested for roller pad build-up. Solutions were prepared as according to the following composition (5 g/L Invadine PBN, 60 g/L Knittex 7636 and 60 g/L of each of the Examples at 5.7% F). Invadine PBN and Knittex 7636 are commonly used surfactant and resin used for fibrous substrate padding. Padding of the fibrous substrates (cotton) was performed continuously for 1 hour at 37° C. After the one hour, the rollers were allowed to dry. The mass of the rollers was measured before and after padding and the difference was reported in Table 1 as "g of polymer on roller". The rollers were also visually inspected and observations were noted in Table 1. If build-up occurred, attempts were made to remove the buildup and observations were made on the effectiveness of removal.

EXAMPLES

Materials

2-EHMA is 2-Methyl-2-propenoic acid, 2-ethylhexyl ester or 2-ethylhexyl(meth)acrylate.

SMA is 2-Propenoic acid, 2-methyl-, octadecyl ester, or stearyl(meth)acrylate.

7-EO MA is Poly(oxy-1,2-ethanediyl), $\alpha$-(2-methyl-1-oxo-2-propenyl)-$\omega$-hydroxy-), or 7-EO-(meth)acrylate.

MAM is 2-Propenamide, N-(Hydroxymethyl)-, or N-methylol(meth)acrylamide.

VDC is vinylidene chloride.

HEMA is 2-Propenoic acid, 2-methyl-, 2-hydroxyethyl ester, or 2-hydroxyethyl(meth)acrylate.

DDM is 1-Dodecanethiol.

DPG is Dipropylene glycol.

PPG is Propylene glycol.

Example 1

De-ionized water and a surfactant (1.14% by weight of emulsion, Armeen DM18D) were pre-heated and melted in a water bath at 50° C. The pre-heated/melted ingredients along with monomers $CF_3(CF_2)_5CH_2OC(O)C(CH_3)\!\!=\!\!CH_2$ (66.61% weight of polymer and 19.74% by weight of emulsion), 7-EOMA (1.84% weight of polymer and 0.35% by weight of emulsion), SMA (18.86% weight of polymer and 5.59% by weight of emulsion), MAM (0.90% weight of polymer and 0.56% by weight of emulsion), HEMA (1.22% weight of polymer and 0.36% by weight of emulsion), DDM (0.46% weight of polymer and 0.14% by weight of emulsion), a second surfactant (0.57% by weight of emulsion, TERGITOL TMN-10), a defoamer (1.81% by weight of emulsion), DPG (5.42% by weight of emulsion), and soy methyl ester (0.49% by weight of emulsion, STEPOSOL SB-D commercially available from Stepan Company, Northfield, Ill.) were added to a plastic container and the resulting mixture was statically mixed in a blender on low speed for 1 minutes, then homogenized for 4 passes at 4350 psig (single stage). The emulsion composition was then charged into a 500 mL, 4-neck round-bottom flask (equipped with a condenser and overhead stirring) and sparged with nitrogen until cooled below 32° C., after which the sparging was halted and a nitrogen blanket was introduced. When below 30° C., VDC (9.50% by weight of polymer and 2.81% by weight of emulsion) was added and the emulsion composition was allowed to stir for 15 minutes. After 15 minutes, Vazo-56 in water was added. The emulsion composition was then heated over 30 minutes to 65° C. and then held at temperature for 8 hours. After cooling to room temperature, the final emulsion composition was filtered through a 25-micron sock filter and the crude percent solids were measured. The final product was then standardized to 35.0% solids with the addition of water and applied to fibrous substrates using a roller pad.

Example 2

De-ionized water and a surfactant (1.16% by weight of emulsion, Armeen DM18D) and soya fatty acid (0.01% by weight of emulsion) were pre-heated and melted in a water bath at 50° C. The pre-heated/melted ingredients along with monomers $CF_3(CF_2)_5CH_2OC(O)C(CH_3)\!\!=\!\!CH_2$ (66.61% weight of polymer and 20.03% by weight of emulsion), 7-EOMA (1.18% weight of polymer and 0.35% by weight of emulsion), SMA (18.86% weight of polymer and 5.67% by weight of emulsion), MAM (0.90% weight of polymer and 0.56% by weight of emulsion), HEMA (1.22% weight of polymer and 0.37% by weight of emulsion), DDM (0.46% weight of polymer and 0.14% by weight of emulsion), a second surfactant (0.58% by weight of emulsion, TERGITOL TMN-10), a defoamer (1.83% by weight of emulsion), DPG (5.50% by weight of emulsion) were added to a plastic container and the resulting mixture was statically mixed in a blender on low speed for 1 minutes, then homogenized for 4 passes at 4350 psig (single stage). The emulsion composition was then charged into a 500 mL, 4-neck round-bottom flask (equipped with a condenser and overhead stirring) and sparged with nitrogen until cooled below 32° C., after which the sparging was halted and a nitrogen blanket was introduced. When below 30° C., VDC (9.50% by weight of polymer and 2.85% by weight of emulsion) was added and the emulsion composition was allowed to stir for 15 minutes. After 15 minutes, Vazo-56 in water was added. The emulsion composition was then heated over 30 minutes to 65° C. and then held at temperature for 8 hours. After cooling to room temperature, the final emulsion composition was filtered through a 25-micron sock filter and the crude percent solids were measured. The final product was then standardized to 35.0% solids with the addition of water and applied to fibrous substrates using a roller pad.

Example 3

De-ionized water and a surfactant (1.14% by weight of emulsion, Armeen DM18D) and soya fatty acid (0.01% by weight of emulsion) were pre-heated and melted in a water bath at 50° C. The pre-heated/melted ingredients along with monomers $CF_3(CF_2)_5CH_2OC(O)C(CH_3)\!\!=\!\!CH_2$ (66.61% weight of polymer and 19.74% by weight of emulsion), 7-EOMA (1.18% weight of polymer and 0.35% by weight of emulsion), SMA (18.86% weight of polymer and 5.59% by weight of emulsion), MAM (0.90% weight of polymer and 0.56% by weight of emulsion), HEMA (1.22% weight of polymer and 0.36% by weight of emulsion), DDM (0.46% weight of polymer and 0.14% by weight of emulsion), a second surfactant (0.57% by weight of emulsion, TERGI- TOL TMN-10), a defoamer (1.81% by weight of emulsion), DPG (5.52% by weight of emulsion), and soy methyl ester (0.49% by weight of emulsion, STEPOSOL SB-D) were added to a plastic container and the resulting mixture was statically mixed in a blender on low speed for 1 minutes, then homogenized for 4 passes at 4350 psig (single stage). The emulsion composition was then charged into a 500 mL, 4-neck round-bottom flask (equipped with a condenser and overhead stirring) and sparged with nitrogen until cooled below 32° C., after which the sparging was halted and a nitrogen blanket was introduced. When below 30° C., VDC (9.50% by weight of polymer and 2.81% by weight of emulsion) was added and the emulsion composition was allowed to stir for 15 minutes. After 15 minutes, Vazo-56 in water was added. The emulsion composition was then heated over 30 minutes to 65° C. and then held at temperature for 8 hours. After cooling to room temperature, the final emulsion composition was filtered through a 25-micron sock filter and the crude percent solids were measured. The final product was then standardized to 35.0% solids with the addition of water and applied to fibrous substrates using a roller pad.

Example 4

De-ionized water and a surfactant (1.14% by weight of emulsion, Armeen DM18D) and stearic acid (0.01% by weight of emulsion) were pre-heated and melted in a water bath at 50° C. The pre-heated/melted ingredients along with monomers $CF_3(CF_2)_5CH_2OC(O)C(CH_3)=CH_2$ (66.61% weight of polymer and 19.74% by weight of emulsion), 7-EOMA (1.18% weight of polymer and 0.35% by weight of emulsion), SMA (18.86% weight of polymer and 5.59% by weight of emulsion), MAM (0.90% weight of polymer and 0.56% by weight of emulsion), HEMA (1.22% weight of polymer and 0.36% by weight of emulsion), DDM (0.46% weight of polymer and 0.14% by weight of emulsion), a second surfactant (0.57% by weight of emulsion, TERGITOL TMN-10), a defoamer (1.81% by weight of emulsion), DPG (5.52% by weight of emulsion), and soy methyl ester (0.49% by weight of emulsion, STEPOSOL SB-D) were added to a plastic container and the resulting mixture was statically mixed in a blender on low speed for 1 minutes, then homogenized for 4 passes at 4350 psig (single stage). The emulsion composition was then charged into a 500 mL, 4-neck round-bottom flask (equipped with a condenser and overhead stirring) and sparged with nitrogen until cooled below 32° C., after which the sparging was halted and a nitrogen blanket was introduced. When below 30° C., VDC (9.50% by weight of polymer and 2.81% by weight of emulsion) was added and the emulsion composition was allowed to stir for 15 minutes. After 15 minutes, Vazo-56 in water was added. The emulsion composition was then heated over 30 minutes to 65° C. and then held at temperature for 8 hours. After cooling to room temperature, the final emulsion composition was filtered through a 25-micron sock filter and the crude percent solids were measured. The final product was then standardized to 35.0% solids with the addition of water and applied to fibrous substrates using a roller pad.

Comparative Example A

De-ionized water and a surfactant (2.07% by weight of emulsion, Armeen DM18D) were pre-heated and melted in a water bath at 50° C. The pre-heated/melted ingredients along with monomers $CF_3(CF_2)_5CH_2OC(O)C(CH_3)=CH_2$ (56.96% weight of polymer and 20.93% by weight of emulsion), 7-EOMA (1.18% weight of polymer and 0.43% by weight of emulsion), SMA (28.52% weight of polymer and 10.48% by weight of emulsion), MAM (1.87% weight of polymer and 0.69% by weight of emulsion), HEMA (1.22% weight of polymer and 0.45% by weight of emulsion), DDM (0.46% weight of polymer and 0.17% by weight of emulsion), a second surfactant (1.61% by weight of emulsion), TERGITOL TMN-10), a defoamer (2.24% by weight of emulsion) and DPG (6.72% by weight of emulsion) were added to a plastic container and the resulting mixture was statically mixed in a blender on low speed for 1 minutes, then homogenized for 4 passes at 4350 psig (single stage). The emulsion composition was then charged into a 500 mL, 4-neck round-bottom flask (equipped with a condenser and overhead stirring) and sparged with nitrogen until cooled below 32° C., after which the sparging was halted and a nitrogen blanket was introduced. When below 30° C., VDC (9.49% by weight of polymer and 3.49% by weight of emulsion) was added and the emulsion composition was allowed to stir for 15 minutes. After 15 minutes, Vazo-56 in water was added. The emulsion composition was then heated over 30 minutes to 65° C. and then held at temperature for 8 hours. After cooling to room temperature, the final emulsion composition was filtered through a 25-micron sock filter and the crude percent solids were measured. The final product was then standardized to 35.0% solids with the addition of water and applied to fibrous substrates using a roller pad.

TABLE 1

Roller-pad Buildup Results

| Example | g of polymer on roller | Description of Roller |
|---|---|---|
| 1 | 0.44 | sticky and glossy finish, difficult to remove |
| 2 | 0.3 | dry non-sticky finish, difficult to remove |
| 3 | 0.25 | dry non-sticky finish, easy to remove |
| 4 | 0.2 | dry non-sticky finish, easy to remove |
| Comparative Example A | 0.4 | sticky and glossy finish, difficult to remove |

What is claimed is:

1. An aqueous emulsion composition comprising
   i) a partially fluorinated copolymer comprising the reaction product of monomers:
      a) one or more monomers of Formula (I):

$$R_f\text{-L-Q-C(O)}\text{---}CR^1\text{=}CH_2 \quad\quad (I);$$

b) one or more monomers of Formula (II):

$$R_H\text{-Q-C(O)}\text{---}CR^2\text{=}CH_2 \quad\quad (II);$$

c) one or more monomers of Formula (III):

$$R\text{---}(OCH_2CH_2)_n\text{---}(OCH_2CH(CH_3))_p\text{Q-C(O)---}CR^3\text{=}CH_2 \quad\quad (III);$$

d) one or more monomers of Formula (IV):

$$HO\text{---}CH_2\text{---}NH\text{---}C(O)\text{---}CR^4\text{=}CH2 \quad\quad (IV);$$

and
   ii) co-solvents comprising one or more fatty acids and one or more esters of fatty acids;
   iii) one or more surfactants; and optionally
   iv) one or more defoamers;
   wherein
   $R_f$ is a linear or branch fluoroalkyl of 2 to 10 carbons optionally interrupted by 1 to 4 interrupting groups —O—, —CH_2—, and/or —CHF— groups;

$R_H$ is a linear, branched, or cyclic alkyl chain of 7 to 22 carbons;

each Q is independently —O— or —S—;

L is —$R^5$—, —$SO_2$—N($R^6$)—$R^7$—, —CO—N($R^8$)—$R^7$—, —$CH_2CH(OR^9)CH_2$—, —$R^7$—$SO_2$—N($R^8$)—, or —$R^7$—O—C(O)—N($R^8$)—$R^7$—;

$R^1$, $R^2$, $R^3$, and $R^4$ are each independently H or —$CH_3$;

R is —H or a linear, branched, or cyclic alkyl chain of 1 to 20 carbons;

$R^5$ and $R^7$ are each independently a linear or branched divalent alkyl chain of 2 to 10 carbons;

$R^6$, $R^8$ and $R^9$ are each independently —H, —$CH_3$, $C_2$ to $C_{10}$ alkylene, or $C_1$ to $C_4$ acyl; and n is 0 to 10 and p is 0 to 10 provided that p+n is greater than 0;

wherein the concentration of monomers of a), b), c), and d) are equal to 100% by weight of the copolymer.

2. The aqueous emulsion of claim 1, wherein the partially fluorinated copolymer further comprises repeat units from e) one or more monomers of vinylidene chloride, vinyl chloride, or mixtures thereof, wherein the concentration of monomers of a), b), c), d), and e) are equal to 100% by weight of the copolymer.

3. The aqueous emulsion of claim 1, wherein the co-solvent further comprises glycerides, glycols, glycerols, or mixtures thereof.

4. The aqueous emulsion of claim 2, wherein the co-solvent further comprises glycerides, glycols, glycerols, or mixtures thereof.

5. The aqueous emulsion of claim 3, wherein the co-solvent comprises at least one fatty acid selected from soya fatty acid, ethanoic acid, propanoic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, myristoleic acid, palmitoleic acid, palmitic acid, sapienic acid, oleic acid, elaidic acid, vaccenic acid, linoleic acid, linoelaidic acid, α-linolenic acid, arachidonic acid, eicosapentaenoic acid, erucic acid, docosahexaenoic acid, hexadecatrienoic acid, alpha-linolenic acid, stearidonic acid, eicosatrienoic acid, eicosatetraenoic acid, eicosapentaenoic acid, heneicosapentaenoic acid, docosapentaenoic acid, tetracosapentaenoic acid, tetracosahexaenoic acid, gamma-linolenic acid, eicosadienoic acid, dihomo-gamma-linolenic acid, arachidonic acid, docosadienoic acid, adrenic acid, docosapentaenoic acid, osbond acid, tetracosatetraenoic acid, tetracosapentaenoic acid, eicosenoic acid, mead acid, erucic acid, nervonic acid, rumenic acid, α-calendic acid, β-calendic acid, jacaric acid, stearic acid, α-eleostearic acid, β-eleostearic acid, catalpic acid, punicic acid, rumelenic acid, α-parinaric acid, β-parinaric acid, bosseopentaenoic acid, pinolenic acid, podocarpic acid, or mixtures thereof.

6. The aqueous emulsion of claim 3, wherein the co-solvent comprises at least one ester of fatty acid selected from esters of soya fatty acids, esters of ethanoic acid, esters of propanoic acid, esters of butanoic acid, esters of pentanoic acid, esters of hexanoic acid, esters of heptanoic acid, esters of octanoic acid, esters of nonanoic acid, esters of decanoic acid, esters of undecanoic acid, esters of dodecanoic acid, esters of tridecanoic acid, esters of tetradecanoic acid, esters of pentadecanoic acid, esters of hexadecanoic acid, esters of myristoleic acid, esters of palmitoleic acid, palmitic acid, esters of sapienic acid, esters of oleic acid, esters of elaidic acid, esters of vaccenic acid, esters of linoleic acid, esters of linoelaidic acid, esters of α-linolenic acid, esters of arachidonic acid, esters of eicosapentaenoic acid, esters of erucic acid, esters of docosahexaenoic acid, esters of hexadecatrienoic acid, esters of alpha-linolenic acid, esters of stearidonic acid, esters of eicosatrienoic acid, esters of eicosatetraenoic acid, esters of eicosapentaenoic acid, esters of heneicosapentaenoic acid, esters of docosapentaenoic acid, esters of tetracosapentaenoic acid, esters of tetracosahexaenoic acid, esters of gamma-linolenic acid, esters of eicosadienoic acid, esters of dihomo-gamma-linolenic acid, esters of arachidonic acid, esters of docosadienoic acid, esters of adrenic acid, esters of docosapentaenoic acid, esters of osbond acid, esters of tetracosatetraenoic acid, esters of tetracosapentaenoic acid, esters of eicosenoic acid, esters of mead acid, esters of erucic acid, esters of nervonic acid, esters of rumenic acid, esters of α-calendic acid, esters of β-calendic acid, esters of jacaric acid, esters of stearic acid, α-eleostearic acid, esters of β-eleostearic acid, esters of catalpic acid, esters of punicic acid, esters of rumelenic acid, esters of α-parinaric acid, esters of β-parinaric acid, esters of bosseopentaenoic acid, esters of pinolenic acid, esters of podocarpic acid, or mixtures thereof.

7. The aqueous emulsion of claim 3, wherein the co-solvent further comprises glycerides selected from mono-, di-, or tri-glycerides of soya fatty acid, ethanoic acid, propanoic acid, butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, myristoleic acid, palmitoleic acid, palmitic acid, sapienic acid, oleic acid, elaidic acid, vaccenic acid, linoleic acid, linoelaidic acid, α-linolenic acid, arachidonic acid, eicosapentaenoic acid, erucic acid, docosahexaenoic acid, hexadecatrienoic acid, alpha-linolenic acid, stearidonic acid, eicosatrienoic acid, eicosatetraenoic acid, eicosapentaenoic acid, heneicosapentaenoic acid, docosapentaenoic acid, tetracosapentaenoic acid, tetracosahexaenoic acid, gamma-linolenic acid, eicosadienoic acid, dihomo-gamma-linolenic acid, arachidonic acid, docosadienoic acid, adrenic acid, docosapentaenoic acid, osbond acid, tetracosatetraenoic acid, tetracosapentaenoic acid, eicosenoic acid, mead acid, erucic acid, nervonic acid, rumenic acid, α-calendic acid, β-calendic acid, jacaric acid, stearic acid, α-eleostearic acid, β-eleostearic acid, catalpic acid, punicic acid, rumelenic acid, α-parinaric acid, β-parinaric acid, bosseopentaenoic acid, pinolenic acid, podocarpic acid, or mixtures thereof.

8. The aqueous emulsion of claim 3, wherein the co-solvent further comprises glycols selected from linear diols, branched diols, glycols, or mixtures thereof.

9. The aqueous emulsion of claim 8, wherein the glycols comprise 1,2-propanediol, 1,2-butandediol, 2,3-butanediol, 1,3-butanediol, 1,2-pentanediol, etohexadiol, p-menthane-3,8-diol, 2-methyl-2,4-pentanediol, 1,3-propanediol, 1,4-butanediol, 1,5-pentanediol, 1,8-octanediol, propylene glycol, dipropylene glycol, ethylene glycol, diethylene glycol, or mixtures thereof.

10. A method for treating a fibrous substrate comprising contacting the fibrous substrates surface with an aqueous emulsion composition comprising
i) a partially fluorinated copolymer comprising the reaction product of monomers:
a) one or more monomers of Formula (I):

b) one or more monomers of Formula (II):

c) one or more monomers of Formula (III):

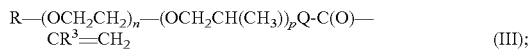
$$R-(OCH_2CH_2)_n-(OCH_2CH(CH_3))_p Q\text{-}C(O)-CR^3{=}CH_2 \quad (III);$$

d) one or more monomers of Formula (IV):

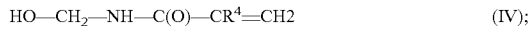
$$HO-CH_2-NH-C(O)-CR^4{=}CH_2 \quad (IV);$$

and ii) co-solvents comprising one or more fatty acids and one or more esters of fatty acids;
iii) one or more surfactants; and optionally
iv) one or more defoamers;

wherein $R_f$ is a linear or branch fluoroalkyl of 2 to 10 carbons optionally interrupted by 1 to 4 interrupting groups —O—, —CH$_2$—, and/or —CHF— groups;

$R_H$ is a linear, branched, or cyclic alkyl chain of 7 to 22 carbons;

each Q is independently —O— or —S—;

L is —R$^5$—, —SO$_2$—N(R$^6$)—R$^7$—, —CO—N(R$^8$)—R$^7$—, —CH$_2$CH(OR$^9$)CH$_2$—, —R$^5$—SO$_2$—N(R$^8$)—, or —R$^5$—O—C(O)—N(R$^8$)—R$^7$—O—;

R$^1$, R$^2$, R$^3$, and R$^4$ are each independently H or —CH$_3$;

R is —H or a linear, branched, or cyclic alkyl chain of 1 to 20 carbons;

R$^5$ and R$^7$ are each independently a linear or branched divalent alkyl chain of 2 to 10 carbons;

R$^6$, R$^8$ and R$^9$ are each independently —H, —CH$_3$, C$_2$ to C$_{10}$ alkylene, or C$_1$ to C$_4$ acyl; and n is 0 to 10 and p is 0 to 10 provided that p+n is greater than 0;

wherein the concentration of monomers of a), b), c), and d) are equal to 100% by weight of the copolymer.

11. The method of claim 10, wherein the partially fluorinated copolymer further comprises e) one or more monomers of vinylidene chloride, vinyl chloride, or mixtures thereof, wherein the concentration of monomers of a), b), c), d), and e) are equal to 100% by weight of the copolymer.

12. The method of claim 10 or 11, wherein the co-solvent further comprises glycerides, glycols, glycerols, or mixtures thereof.

13. A substrate comprising a fibrous substrate having been treated according to the method of claim 10 or 11.

14. The substrate of claim 13 which is selected from the group consisting of fibers, yarns, fabrics, fabric blends, textiles, nonwovens, paper, leather, rugs and carpets.

15. The substrate of claim 13 which is comprised of cotton, cellulose, wool, silk, polyimide, polyester, polyolefin, polyacrylonitrile, polypropylene, rayon, nylon, aramid, acetate, spunlaced nonwovens, and spunbonded-meltblown-spunbonded nonwovens.

16. The method of claim 10 or 11, further comprising the steps of removing excess aqueous emulsion composition from the treated substrate by using squeeze rolls and curing the treated substrate by heating.

* * * * *